C. C. RUTLEDGE.
PLUMB LEVEL.
APPLICATION FILED DEC. 20, 1912.
1,085,165. Patented Jan. 27, 1914.
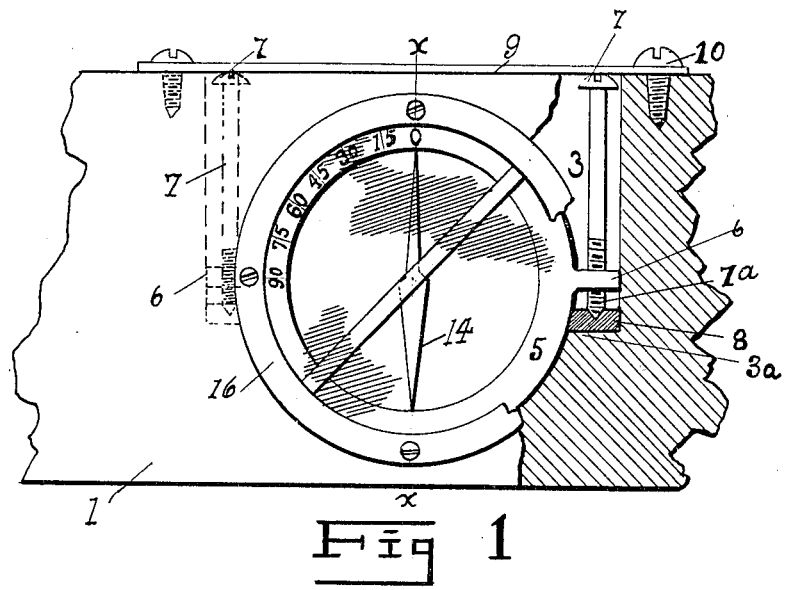
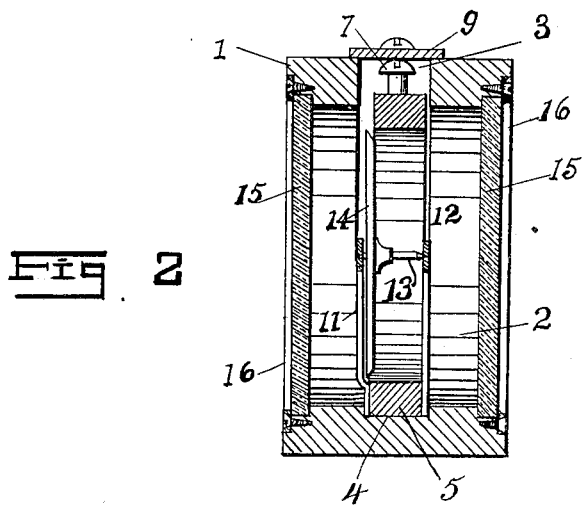
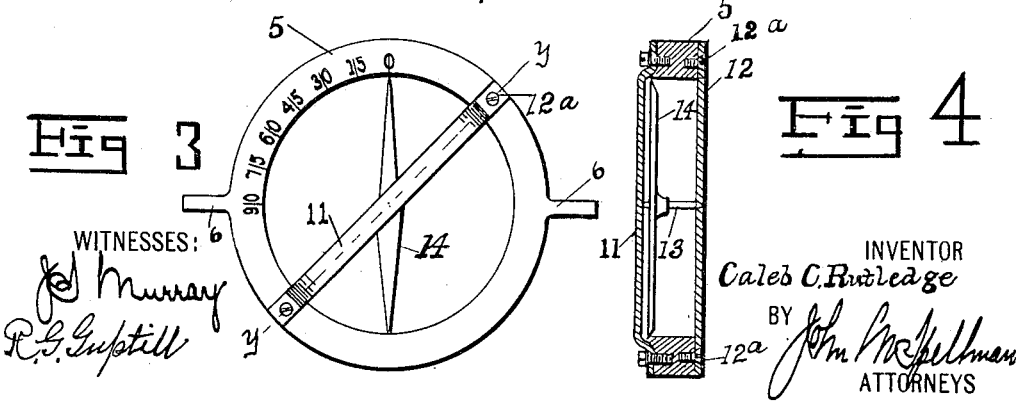
WITNESSES:
INVENTOR
Caleb C. Rutledge
BY
ATTORNEYS

UNITED STATES PATENT OFFICE.

CALEB C. RUTLEDGE, OF ALVORD, TEXAS.

PLUMB-LEVEL.

1,085,165.  Specification of Letters Patent.  Patented Jan. 27, 1914.

Application filed December 20, 1912.  Serial No. 737,768.

*To all whom it may concern:*

Be it known that I, CALEB C. RUTLEDGE, citizen of the United States, residing at Alvord, in the county of Wise and State of Texas, have invented certain new and useful Improvements in Plumb-Levels, of which the following is a specification.

My invention relates to a new and useful plumb level, and its object is to provide a plumb level, the indicating mechanism of which will consist in a weighted pointer rigidly mounted upon a spindle, so that the pointer will remain constantly vertical, for any inclination of the level.

Another object is to provide a plumb level which will accurately indicate the degree of any angle to which said level may be inclined, this result being accomplished by causing a pivoted, weighted pointer to indicate upon an annular scale having an adjustable relation to the body of the level.

A further object is to provide a mechanism for adjusting the indicating parts with relation to the body of the level so as to correct any inaccuracy which may be occasioned by the instrument being accidentally subjected to some heavy shock.

Finally, the object of my invention is to provide a device of the character described, that will be strong, durable simple and efficient, and comparatively easy to construct, and also one that will not be likely to get out of working order.

With these and various other objects in view, my invention has relation to certain novel features of the construction and operation, an example of which is described in the following specification and illustrated in the accompanying drawing, wherein:

Figure 1 is a front view, showing the center portion of a leveling bar, with which bar is correlated the novel indicating mechanism constituting the subject matter of this invention, a portion of the bar being sectionally shown to make clear the interior construction of the level. Fig. 2 is a transverse, sectional view of the device taken upon the line $x$—$x$ of Fig. 1. Fig. 3 is a detail, front view of an annular frame or ring which carries the indicating parts of the instrument. Fig. 4 is a transverse, sectional view taken upon the line $y$—$y$ of Fig. 3.

Referring now more particularly to the drawing, wherein like reference characters designate similar parts in all the figures, the numeral 1 denotes a leveling bar, which bar is provided at its center with a transverse, circular aperture 2. A slot 3 formed in the top of the bar midway between the lateral edges thereof and parallel to said edges has communication with the circular aperture 2. The length of the slot 3 is somewhat greater than the diameter of the aperture 2, so that a shoulder $3^a$ is formed at each end of the slot, as is clearly shown in Fig. 1 of the drawing. A semi-annular groove 4 is formed in the lower half of the aperture 2, the walls of said groove being in alinement with those of the slot 3. A metal ring 5 is adapted to be introduced through the slot 3 into the aperture 2, and to be permanently mounted in said aperture. The diameter of said ring being equal to that of the groove 4, into which groove the peripheral portion of the ring extends. At diametrically opposite points, the ring 5 is provided with laterally projecting lugs 6, into which lugs are respectively threaded two parallel screws 7. Upon each of the shoulders $3^a$ is mounted a small plate 8, and each of said plates is centrally provided upon its top surface with a conical depression $7^a$, which when the ring 5 is in place, form swivel bearings for the lower extremities of the screws 7. It is apparent, therefore, that by turning either of the screws 7, the correlated sides of the ring 5 will be subjected to a very gradual, upward or downward displacement, thus communicating to the ring a very gradual rotary movement, making it possible to adjust the ring very accurately with relation to the leveling bar. The headed extremities of the screws 7 are flush with the top surface of the leveling bar 1, and are contiguous with the under face of a plate 9, which covers the slot 3, and is secured to the bar 1 by screws 10 passing through the extremities of said plate. The bar 9 serves the double purpose of forming a closure for the slot 3, and preventing any upward displacement of the ring 5 through its contact with the screws 7 which have a rigid connection with the said ring.

To the lateral faces of the ring 5, there are secured the extremities of a pair of spaced diametral bars 11 and 12, the extremities of said bars being counter-sunk in the correlated faces of the ring 5, and being secured to said ring by screws $12^a$. Between the center points of said bars is mounted a pintle 13 having its extremities pivoted in said bars, the bearings being such as to produce a minimum of friction. Upon said pintle there is mounted fast a pointer 14, tapered at both extremities which extremities are very slightly spaced from the inner edge of the front surface of the ring 5. One-half of the pointer 14 will be considerably larger and heavier than the other half, thus causing the pointer to constantly occupy a vertical position such that its center of gravity will be beneath the pivotal support. The inner diameter of the ring 5 is less than the diameter of the aperture 2, an annular portion of the lateral face of the ring thus being exposed through said aperture 2, upon which exposed portion is provided a scale indicating degrees ranging from 0 to 90. In the drawing, this scale is shown as extending only over one quadrant of the ring, but it is to be understood that all four quadrants of the ring may be similarly graduated. The figures of the scale carried by the ring are so disposed that when the leveling bar is horizontal, the pointer will indicate 0 upon said scale and when the leveling bar is vertical, the pointer will indicate 90 degrees upon the scale. Similarly in any intermediate positions of the leveling bar between horizontal and vertical, the angle at which the bar is inclined will be indicated by the needle upon the scale. Into each lateral surface of the leveling bar, there is set a circular glass plate 15 concentric with the aperture 2 and covering the same. Each of said glass plates is retained in place by a ring 16 secured by screws or other suitable means to the correlated surface of the leveling bar and having its inner edge overhanging the outer edge of said plate. The rings 16 are set into the correlated surfaces of the bar 1 so that they are flush with said surfaces.

The above-described plumb level is far superior to the level now in common use since it serves not only to indicate when a level has been found, but indicate the various angles in degrees at which the level may be inclined.

The invention is presented as including all such changes and modifications as properly come within the scope of the following claims:

What I claim is:

1. In a plumb level, a level body having a circular transverse opening intermediate its ends, transparent plates closing the opening at each side of the body, the body having a vertical longitudinal slot over its opening and a semi-circular groove in the bottom of the opening in the vertical plane of the slot, shoulders at opposite sides of the groove within the opening of the body, a scale ring resting in the groove and rotatable in the slot of the body, lugs projecting from the periphery of the ring adjacent the shoulders, recessed bearing plates mounted on the shoulders, adjusting screws engaging in the lugs and bearing in the recesses of the bearing plates, a weighted pointer pivotally carried by the ring, and a closure plate mounted on the body over the slot and concealing the screws.

2. In a plumb level, a level body having a circular transverse opening intermediate its ends, transparent plates closing the opening at each side of the body, the body having a vertical longitudinal slot over its opening and a semi-circular groove in the bottom of the opening in the vertical plane of the slot, shoulders at opposite sides of the groove within the opening of the body, a scale ring resting in the groove and rotatable in the slot of the body, lugs projecting from the periphery of the ring adjacent the shoulders, recessed bearing plates mounted on the shoulders, adjusting screws engaging in the lugs and bearing in the recesses of the bearing plates, bars secured to opposite sides of the ring diametrically thereof, a weighted pointer having pivotal bearings in the bars and mounted therebetween, and a metal plate secured on the body and closing the slot.

In testimony whereof I have signed my name to this specification in the presence of two subscribing witnesses.

CALEB C. RUTLEDGE.

Witnesses:
D. B. CARR,
J. S. MURRAY.